US00RE37679E

(19) United States
(12) Reissued Patent
Suh

(10) Patent Number: US RE37,679 E
(45) Date of Reissued Patent: Apr. 30, 2002

(54) SIGNAL SELECTION CIRCUIT OF INTELLIGENCE TELEVISION

(75) Inventor: Moon-hwan Suh, Seoul (KR)

(73) Assignee: Samsung Electronics Co., Ltd., Kyungki-Do (KR)

(21) Appl. No.: 09/512,747

(22) Filed: Feb. 24, 2000

Related U.S. Patent Documents

Reissue of:
(64) Patent No.: 5,721,593
Issued: Feb. 24, 1998
Appl. No.: 08/713,226
Filed: Sep. 12, 1996

(30) Foreign Application Priority Data

Sep. 14, 1995 (KR) ..... 95-30383

(51) Int. Cl.[7] ..... H04N 5/445
(52) U.S. Cl. ..... 348/564; 348/565; 348/569; 348/706
(58) Field of Search ..... 348/563, 564, 348/565, 566, 569, 570, 584, 588, 589, 598, 599, 600, 705, 706, 725, 728, 731; H04N 5/445, 5/45, 5/50, 5/268

(56) References Cited

U.S. PATENT DOCUMENTS 5,128,766 A * 7/1992 Choi ..... 348/564
5,604,543 A * 2/1997 Baek ..... 348/564

* cited by examiner

*Primary Examiner*—Sherrie Hsia
(74) *Attorney, Agent, or Firm*—Sughrue, Mion, Zinn, Macpeak & Seas, PLLC

(57) ABSTRACT

A signal selection circuit is disclosed for use in an intelligence TV. The intelligence TV can display a signal prioritized in the order of a TV OSD signal, a PIP signal, an information signal, and a TV signal. The structure for carrying out this prioritization includes a TV signal processor for processing a TV signal and outputting a TV signal, an information signal processor for outputting an information signal by decoding the received information data from value added networks and for outputting a first switching control signal by recognizing a selection mode, and a PIP signal processor for processing the TV signals as a main picture signal and a sub picture signal and for outputting a PIP signal and a second switching control signal. A TV microcomputer generates an OSD for the operation of the TV. Plural switching devices operate responsively to switching control signals from the TV microcomputer, the information signal processing unit and the PIP signal processor. A driver supplies the cathode ray tube with the signal selected by the switching devices.

24 Claims, 4 Drawing Sheets

SIGNAL SELECTION CIRCUIT OF INTELLIGENCE TELEVISION

Matter enclosed in heavy brackets [ ] appears in the original patent but forms no part of this reissue specification; matter printed in italics indicates the additions made by reissue.

BACKGROUND OF THE INVENTION

The present invention relates to a signal selection circuit of an intelligence television capable of receiving communication services, and more particularly, to a signal selection circuit of an intelligence TV for selecting a signal to be displayed, in accordance with the order of priority of the signal.

An intelligence TV is for receiving communication services by connecting a TV to a value added network (VAN). The intelligence TV includes an information signal processing unit for receiving information communication data (hereinafter, "information data") when the intelligence TV is connected to the VAN, and for outputting information RGB signals, and switching control signals in order to display the information data on a screen. The intelligence TV selects and displays on the screen one of the information RGB signals processed in the information signal processing unit and a TV RGB signal processed in a TV signal processing unit, in accordance with the switching control signal output from the information signal processing unit.

Since this intelligence TV makes it possible to view, through a TV screen, several communication services, such as stock quotes, news services, weather reports, and TV program lists, being transmitted through the value added networks, it has an advantage that persons who are not familiar with the usage of a computer can easily receive communication services.

Even though this intelligence TV has the advantage of receiving communication services through the TV screen, it cannot display a plurality of signals at the same time, such as an information signal for displaying information data on a screen, a TV signal, a Picture-In-Picture (PIP) signal for enabling two screens to be viewed simultaneously, and a TV on-screen-display (OSD) signal. Thus, the plurality of signals are displayed according to priority after the priorities have been decided.

In other words, an information signal needs to be displayed preferentially over a TV signal, a PIP signal needs to be displayed preferentially over an information signal, and a TV OSD signal needs to be displayed preferentially over a PIP signal.

SUMMARY OF THE INVENTION

An object of the present invention is to satisfy the above requirements and provide a signal selection circuit of an intelligence TV for deciding the priorities of signals, in the priority order of a TV OSD signal, a PIP signal, an information signal, and a TV signal, and selecting a signal in accordance with the priorities.

To achieve the above object, according to an embodiment of the present invention, there is provided a signal selection circuit of an intelligence TV, capable of receiving communication services, comprising: a TV signal processing portion for processing a desired TV broadcast signal to be received and outputting a TV signal; an information signal processing unit for outputting an information signal by decoding information data transmitted through value added networks, and for outputting a switching control signal by recognizing a selection mode; a switching device for switching the TV signal processed in the TV signal processing portion and the information signal processed in the information signal processing unit, in accordance with the switching control signal; and a driving device for supplying the signal selected by the switching device to a cathode ray tube (CRT).

A signal selection circuit of an intelligence TV according to another embodiment of the present invention, further includes, in addition to the structure of the above first embodiment, a PIP signal processing portion for processing a predetermined number of TV channel signals as to be a main and a sub screen signals and for outputting a PIP signal and a second switching control signal, and a second switching device for switching the PIP signal processed in the PIP signal processing portion and the signal selected in the first switching device, in accordance with the second switching control signal generated in the PIP signal processing portion.

A signal selection circuit of an intelligence TV, according to still another embodiment of the present invention, further includes, in addition to the structure of the above second embodiment, a TV microcomputer for generating an OSD signal necessary to operate a TV, and a third switching control signal by recognizing a selection mode, and a third switching device for switching the OSD signal generated in the TV microcomputer and the signal selected in the second switching device, in accordance with the third switching control signal generated in the TV microcomputer.

Korean Patent Application no. 95-30383 is hereby incorporated by reference into this application for all purposes.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Referring to the accompanying drawings, preferred embodiments of the signal selection circuits of the intelligence TV according to the present invention will be described below.

Figure 1:
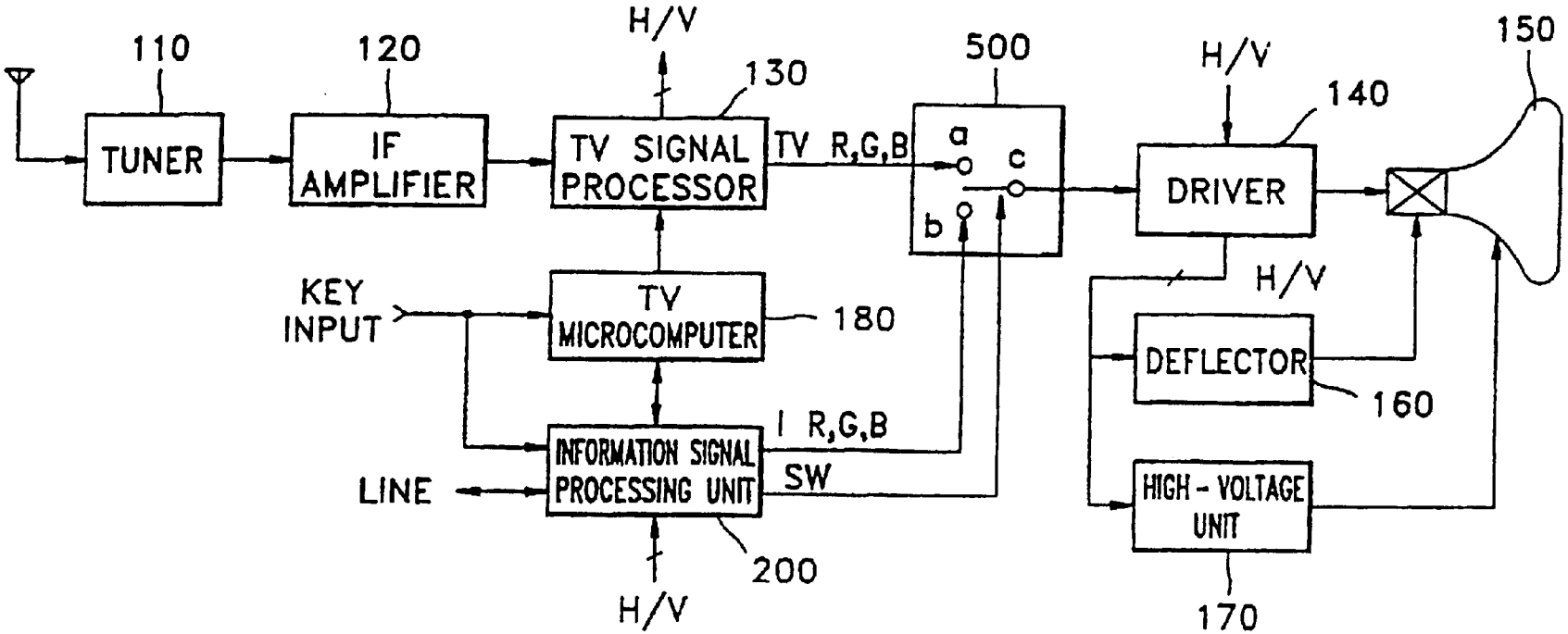
FIG. 1 is a block diagram of a signal selection circuit according to an embodiment of the present invention.

FIG. 1 is a block diagram of a signal selection circuit of an intelligence TV according to an embodiment of the present invention.

In FIG. 1, a tuner 110 selects a desired TV signal among broadcast channel signals received through an antenna and outputs it as an intermediate frequency (IF) signal. An IF amplifier 120 amplifies the IF signal output from the tuner 110.

A TV signal processor 130 processes the amplified IF signal and outputs a TV RGB signal, to be displayed on the TV screen, and a horizontal/vertical synchronization signal H/V.

An information signal processing unit 200 receives information data, by recognizing a communication mode key input and by being connected to value added networks, outputs an information RGB signal by decoding the information data and synchronizing the decoded signal with the horizontal/vertical synchronization signal H/V output from TV signal processor 130, and generates a switching control signal SW for setting the priority of an information signal to be higher than that of a TV signal.

A switching device 500 selects and outputs to a driver 140, one of the TV RGB signal processed in TV signal processor 130 and the information RGB signal processed in the information signal processing unit 200, in accordance with the switching control signal SW generated in the information signal processing unit 200.

Driver 140 displays the RGB signal selected by switching device 500 on a CRT 150, in synchronization with the horizontal/vertical synchronizing signal H/V output from the TV signal processor 130.

A deflector 160 supplies the CRT 150 with a deflection current signal to correct the convergence in accordance with the horizontal/vertical synchronizing signal H/V output from driver 140.

A higher voltage unit 170 supplies the CRT 150 with a high voltage in accordance with the horizontal/vertical synchronizing signal H/V output from driver 140.

A TV microcomputer 180 which recognizes a TV mode key controls the TV signal processor 130 by transmitting and receiving serial data to and from information signal processing unit 200.

Figure 2:
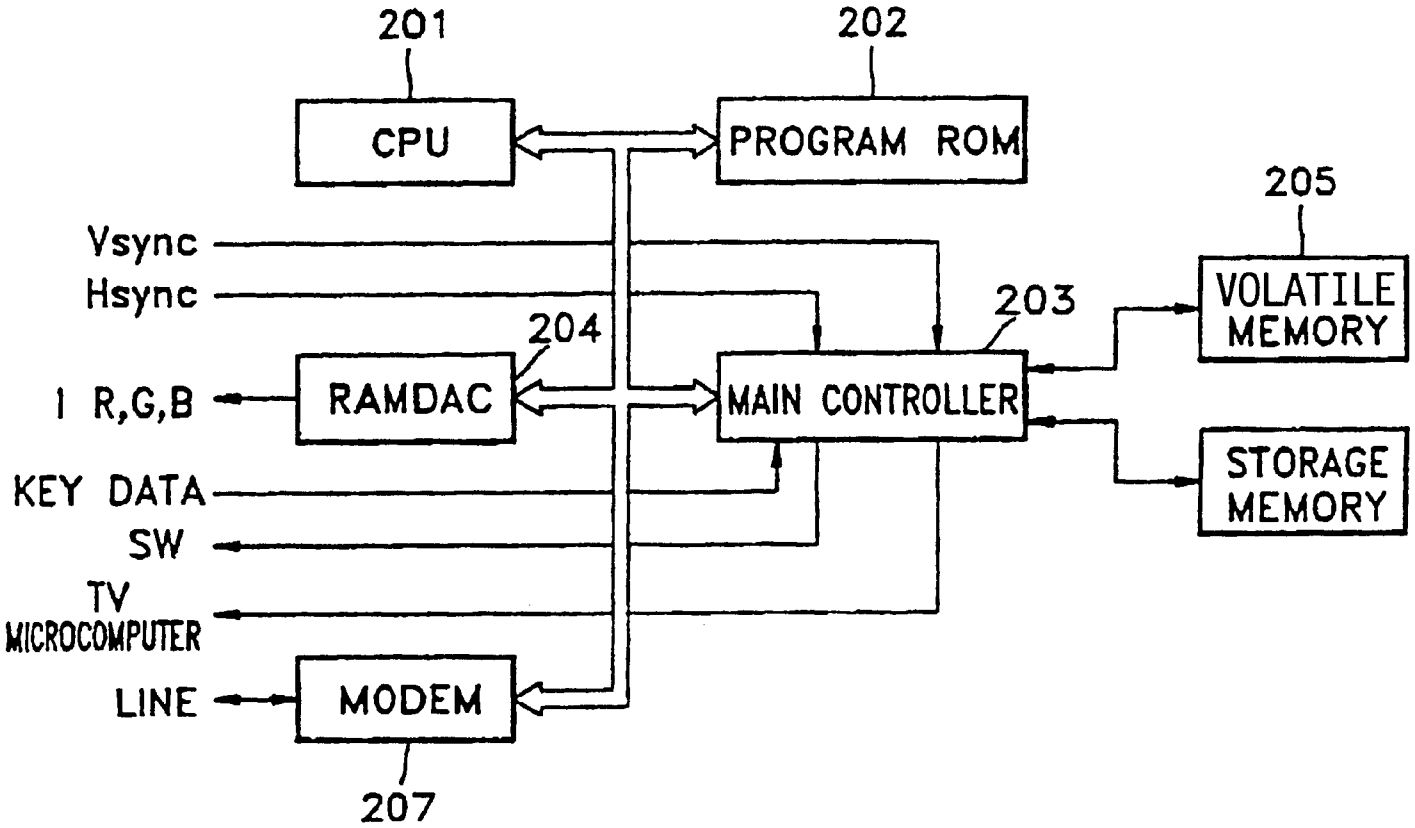
FIG. 2 is a detailed block diagram of the information signal processing unit shown in FIG. 1.

The structure of information signal processing unit 200 is shown in FIG. 2. Here, a CPU 201 executes control over the entire system, data transmissions, and arithmetic operations, according to control signals generated from a main controller 203 and programs stored in a programmable ROM 202.

The processing of data for peripheral functional blocks, executed in the CPU 201, is accomplished by interrupt signals, and the interrupt signals for controlling the system are transferred to the CPU 201 by the main controller 203. The interrupt signals are generated by a modem 207 and the main controller 203.

The main controller 203 outputs interrupt signals to the CPU 201 in cases when infrared data is input in accordance with a key input on a transmitter (not shown) or when an internal timer is operated for the designated operation, and when serial data is transmitted from the TV microcomputer 180 during a vertical blanking period. The CPU 201 executes a corresponding task whenever an interrupt signal is generated.

The programmable ROM 202 stores programs for the operation of the system, font data, and, various decoding programs and data, and the CPU 201 reads data from the programmable ROM 202 and executes a series of corresponding operations. That is, if a communication mode key is input, the main controller 203 recognizes the key input and transmits an interrupt signal to the CPU 201. Then the CPU 201 executes the operation of the communication mode in accordance with programs in the programmable ROM 202.

The main controller 203 recognizes and transmits telephone number data to the CPU 201 in accordance with the key input, the CPU 201 sends the telephone number to the modem 207. Then the modem 207 connects the information signal processing unit 200 to the value added network by dialing the number.

If the modem connects to the value added network and a communication command is input, data corresponding to the communication command is transmitted to a host computer (not shown). Then the host computer transmits information data according to the communication command.

The information data received through the modem 207 is demodulated and applied to the main controller 203. Then, the main controller 203 stores the data in a designated area of a volatile memory 205.

Here, in the case of superimposing the information data over a TV signal, a graphic signal indicative of information synchronized to the horizontal/vertical synchronizing signal H/V output from the TV signal processor 130, is read from the volatile memory 205 and applied to a random-access-memory/digital-to-analog converter (RAM/DAC) 204. Then the RAM/DAC 204 portion converts the graphics signal to an analog RGB signal and outputs the converted result to a second selection terminal b of the switching device 500 shown in FIG. 1.

In the case of displaying the information data on the entire screen, the information data, synchronized to the horizontal/vertical synchronizing signal H/V generated from a synchronizing signal generator (not shown) of the main controller 203, is output through the RAM/DAC portion 204, to the second selection terminal b of the switching device 500 shown in FIG. 1, under the control of the main controller 203.

Also, the main controller 203 outputs the switching control signal SW for controlling the operation of the switching device 500, in accordance with the selection of an information mode and a TV mode, by recognizing a mode selection key selected by a user.

In an information mode, the switching device 500 shown in FIG. 1 selects the output of the information signal processing unit 200 and applies the information RGB signal to the CRT 150 to display an information picture. In a TV mode, the switching device 500 selects the output of TV signal processor 130 and applies the TV RGB signal to the CRT 150 to display a TV picture. In an information and TV mode, the switching device 506 selects the output of the information signal processing unit 200 only to the information area for superimposing the information data on a TV picture and selects the output of TV signal processor 130 for the rest of the screen, thereby superimposing the information data on the TV picture.

Therefore, by controlling the switching device 500 in accordance with switching control signal SW generated from the information signal processing unit 200, only an information picture or only a TV picture can be displayed or an information picture superimposed on a TV picture can be displayed.

Figure 3:
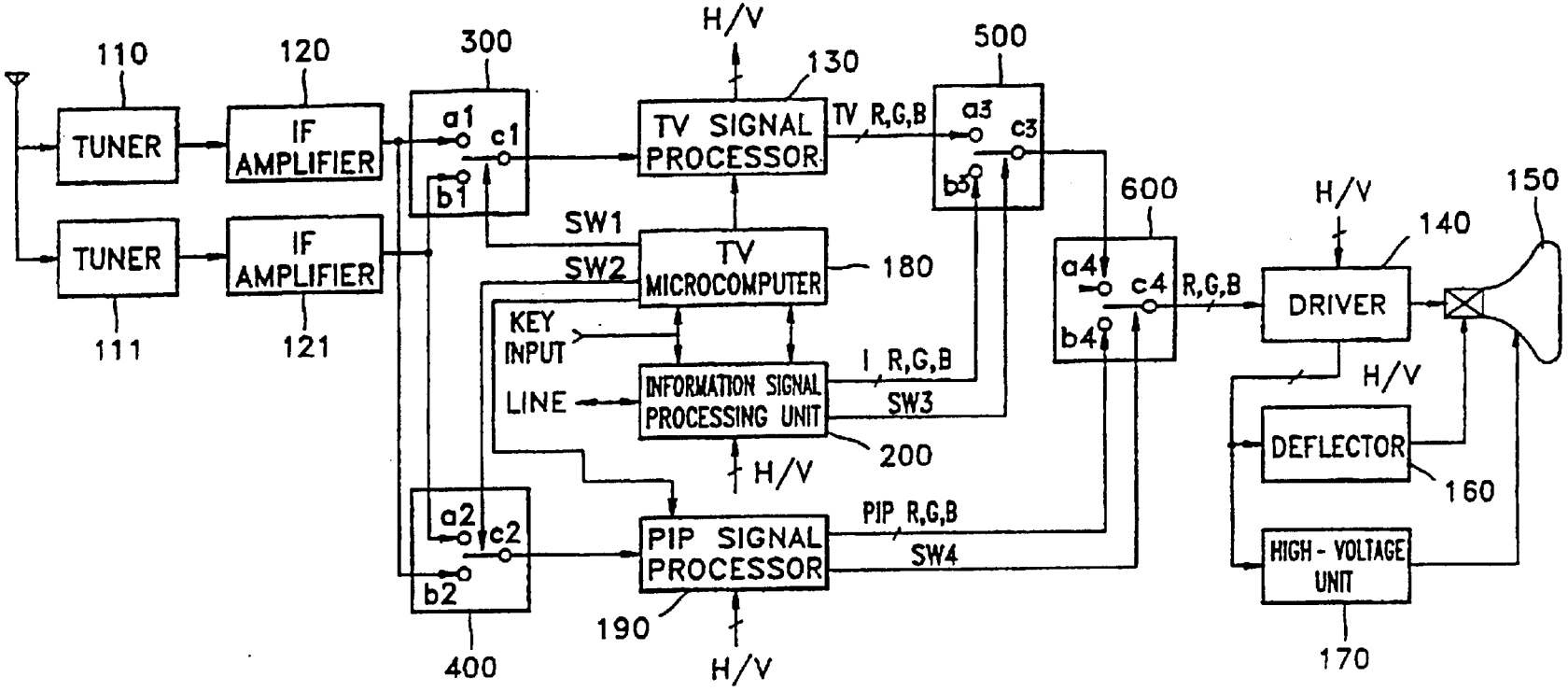
FIG. 3 is a block diagram of a signal selection circuit according to another embodiment of the present invention.

FIG. 3 is a block diagram of a signal selection circuit of an intelligence TV for selecting one of an information signal and a PIP signal according to another embodiment of the present invention. The same reference numerals are designated for the same elements as those in the intelligence TV of FIG. 1, and the detailed descriptions thereof will be omitted.

In FIG. 3, a tuner 110 selects a first TV channel and an IF amplifier 120 amplifies the IF signal of the selected first TV channel. A tuner 11 selects a second TV channel and an IF amplifier 120 amplifies the IF signal of the selected second TV channel.

TV microcomputer 180 recognizes a mode key input, controls a TV signal processor 130 and a PIP signal processor 190, and generates first and second switching control signals SW1 and SW2.

A first switching device 300 selects one of the outputs of the IF amplifiers 120 and 121 in accordance with the first switching control signal SW1 output from the TV microcomputer 180, and outputs the amplified signal to the TV signal processor 130.

A second switching device 400 switches outputs of IF amplifiers 120 and 121 in accordance with second switching control signal SW2 output from TV microcomputer 180, and outputs it to PIP signal processor 190.

The PIP signal processor 190 processes the first and second TV channel signals, switched by the second switching device 400, to be a main and sub picture signals, respectively, and then outputs the PIP RGB signal for the sub picture signal to be displayed on the designated area of the main picture and outputs a fourth switching control signal SW4.

The third switching device 500 selects the TV RGB signal processed in the TV signal processor 130 or the information RGB signal processed in the information signal processing unit 200, in accordance with a third switching control signal SW3 generated from the information signal processing unit 200.

That is, third switching device 500 selects one of a TV signal, an information signal, and a TV and information signal, in accordance with the third switching control signal SW3, and supplies the selected signal to a fourth switching device 600.

Fourth switching device 600 switches between a PIP signal processed in the PIP signal processor 190 or a signal selected by the third switching device 500, in accordance with the fourth switching control signal SW4 generated in the PIP signal processor 190, and supplies the selected signal to the driver 140.

In other words, the fourth switching device 600 selects one of a PIP signal, a PIP and information signal, an information signal, an information and a TV signal, and a TV signal, in accordance with the fourth switching control signal SW4, to be displayed on the CRT 150 via the driver 140.

Here, the PIP signal processor 190 generates the fourth switching control signal SW4 so as to not overlap a PIP signal with an information and TV signal, that is, to not display an information and PIP and TV signal.

In this way, the third switching device 500 selects an information signal preferentially over a TV signal under the control of the information signal processing unit 200, and the fourth switching device 600 selects a PIP signal preferentially over an information signal under the control of the PIP signal processor 190.

Figure 4:
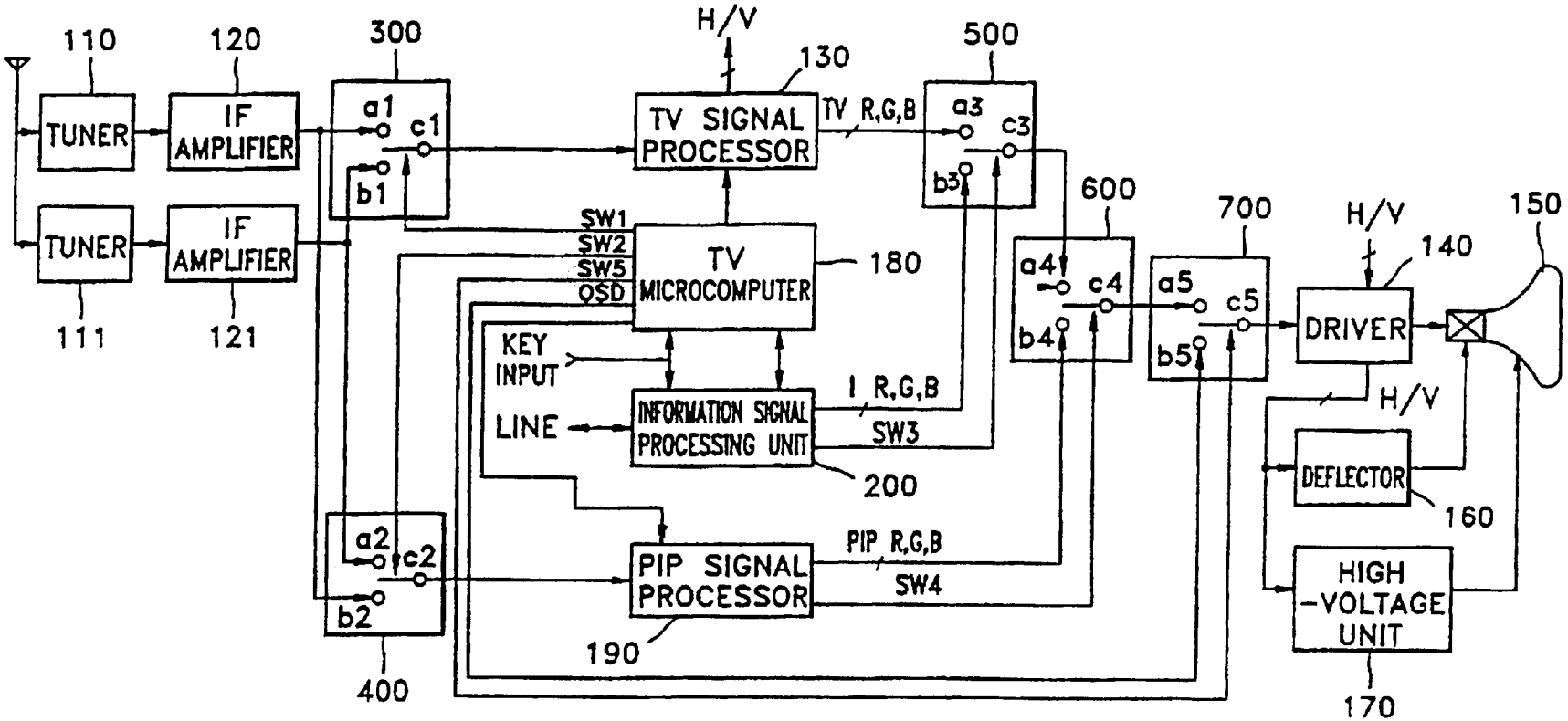
FIG. 4 is a block diagram of a signal selection circuit according to still another embodiment of the present invention.

FIG. 4 is a block diagram of a signal selection circuit of an intelligence TV according to still another embodiment of the present invention. The same reference numerals are designated for the same elements as those in the intelligence TV of FIG. 3, and the detailed descriptions thereof will be omitted.

In FIG. 4, the TV microcomputer 180 recognizes a mode key input, controls the TV signal processor 130 and the PIP signal processor 190, transmits and receives data to and from the information signal processing unit 200, selects signals from the first, second, and fifth switching devices 300,400, 700, respectively, and generates an OSD signal for displaying on a TV to send the selected signals to a second selection terminal b5 of the fifth switching device 700.

The first switching device 300 selects a signal from one of the IF amplifiers 120 and 121 and outputs the selected signal to the TV signal processor 130, in accordance with first switching control signal SW1 output from the TV microcomputer 180.

The second switching device 400 selects an output from one of IF amplifiers 120 and 121 and outputs the selected signal to the PIP signal processor 190, in accordance with the second switching control signal SW2 output from the TV microcomputer 180.

The third switching device 500 selects a TV RGB signal processed in the TV signal processor 130 or an information RGB signal processed in the information signal processing unit 200, in accordance with third switching control signal SW3 generated in the information signal processing unit 200.

The fourth switching device 600 selects a PIP signal processed in the PIP signal processor 190 or a signal selected in the third switching device 500, in accordance with the fourth switching control signal SW4 generated from the PIP signal processor 190.

The fifth switching device 700 selects a signal selected in the fourth switching device 600 or a TV OSD signal output from the TV microcomputer 180, in accordance with the fifth switching control signal SW5 output from the TV microcomputer 180, to be displayed on the CRT 150 via the driver 140.

That is, the third switching device 500 selects one of a TV signal, an information signal, and a TV and information signal, in accordance with the third switching control signal SW3, and sends the selected signal to the fourth switching device 600.

The fourth switching device 600 selects one of a PIP signal, a PIP and information signal, an information signal, an information and TV signal, and a TV signal, in accordance with the fourth switching control signal SW4, and sends the selected signal to the fifth switching device 700.

The fifth switching device 700 selects one of a TV and OSD signal, a PIP and OSD signal, an information and PIP and OSD signal, an information and OSD signal, and an information and TV and OSD signal, in accordance with the fifth switching control signal SW5, to be displayed on the CRT 150 via the driver 140.

In this manner, the third switching device 500 selects an information signal preferentially over a TV signal under the control of the information signal processing unit 200, the fourth switching device 600 selects a PIP signal preferentially over an information signal under the control of the PIP signal processor 190, and the fifth switching device 700 selects a TV OSD signal preferentially over all other signals under the control of the TV microcomputer 180.

Therefore, a signal to be displayed follows the priority of a TV OSD signal, a PIP signal, an information signal, and a TV signal.

As described above, the signal selection circuit of an intelligence TV according to the present invention, having OSD and a PIP operational functions, makes it possible to display a signal in accordance in the priority of a TV OSD signal, a PIP signal, an information signal, and a TV signal.

Although the present invention has been described in terms of several preferred embodiments, it will be appreciated that various modifications and changes may be made to these exemplary embodiments without departing from the scope or spirit of the invention.

What is claimed is:

1. A signal selection circuit of an intelligence TV capable of receiving communication services, said signal selection circuit comprising:

a TV signal processing portion for processing a desired TV signal and outputting a TV signal;

an information signal processing unit for outputting an information signal by decoding information data received from value added networks and for outputting a switching control signal by recognizing a selection mode;

a switching device for selecting between said TV signal processed in said TV signal processing portion and said information signal processed in said information signal processing unit, in accordance with said switching control signal, to produce a selected signal; and a driving portion for supplying a cathode ray tube with said selected signal selected by said switching device.

2. The signal selection circuit according to claim 1, wherein said switching device selects one of said TV signal, said information signal, and a TV and information signal, in accordance with the switching control signal of said information signal processing unit.

3. A signal selection circuit of an intelligence TV capable of receiving communication services, said signal selection circuit comprising:

a TV signal processing portion for processing a desired TV signal and outputting a TV signal;

an information signal processing unit for outputting an information signal by decoding information data received from value added networks and for outputting a first switching control signal by recognizing a selection mode;

a PIP signal processing portion for processing a predetermined number of input TV signals as a main and a sub picture signal, and for outputting a PIP signal and a second switching control signal;

a first switching device for selecting between said TV signal processed in said TV signal processing portion and said information signal processed in said information signal processing unit, in accordance with said first switching control signal;

a second switching device for selecting between the PIP signal processed in said PIP signal processing portion and a signal selected in said first switching device, in accordance with said second switching control signal generated from said PIP signal processing portion; and a driving portion for supplying a cathode ray tube with a [said] signal selected by said second switching device.

4. The signal selection circuit of an intelligence TV according to claim 3, wherein said first switching device selects one of said TV signal, said information signal, and a TV and information signal, in accordance with said first switching control signal.

5. The signal selection circuit of an intelligence TV according to claim 3, wherein said second switching device selects one of the PIP signal, a PIP+information signal, the information signal, an information+TV Signal, and the TV signal, in accordance with the second switching control signal.

6. A signal selection circuit of an intelligence TV capable of receiving communication services, said signal selection circuit comprising:

a TV signal processing portion for processing a desired TV signal and outputting a TV signal;

an information signal processing unit for outputting an information signal by decoding information data received from value added networks and for outputting a first switching control signal by recognizing a selection mode;

a PIP signal processing portion for processing a predetermined number of TV signals as a main signal and a sub picture signal, and for outputting a PIP signal and a second switching control signal;

a TV microcomputer for generating an OSD signal for the operation of a TV, and a third switching control signal by recognizing the selection mode;

a first switching device for selecting between said TV signal processed in said TV signal processing portion and said information signal processed in said information signal processing unit, in accordance with said first switching control signal;

a second switching device for selecting between the PIP signal processed in said PIP signal processing portion and a signal selected in said first switching device, in accordance with said second switching control signal generated in said PIP signal processing portion;

a third switching device for selecting between said OSD signal output from said TV microcomputer and a signal selected in said second switching device, in accordance with said third switching control signal generated in said TV microcomputer; and a driving portion for supplying a cathode ray tube with a signal selected by said third switching device.

7. The signal selection circuit of an intelligence TV according to claim 6, wherein said first switching device selects one of said TV signal, said information signal, and a TV and information signal, in accordance with said first switching control signal.

8. The signal selection circuit of an intelligence TV according to claim 6, wherein said second switching device selects one of said PIP signal, a PIP and information signal, said information signal, an information and TV signal, and said TV signal, in accordance with said second switching control signal.

9. The signal selection circuit of an intelligence TV according to claim 6, wherein said third switching device selects one of a TV and OSD signal, a PIP and OSD signal an information and PIP and OSD signal, an information and OSD signal, and an information and TV and OSD signal, in accordance with said third switching control signal.

10. The signal selection circuit of an intelligence TV according to claim 6, wherein priority is determined in the order of said OSD signal, said PIP signal, said information signal, and said TV signal.

11. The signal selection circuit of an intelligence TV according to claim 6, wherein said TV signal is not superimposed when said PIP signal is superimposed on said information signal.

*12. A signal selection circuit of a TV capable of receiving an image signal and information data services, said signal selection circuit comprising:*

*an image signal processing means for processing a desired image signal and outputting the image signal;*

*a data signal processing unit for outputting information data signal by decoding information data received from networks and for outputting a switching control signal by a selection mode;*

*a switching device for selecting said image signal processed in said image signal processing means and/or said data signal processed in said data signal processing unit, in accordance with the switching control signal, to produce a selected signal; and*

*a driving portion for supplying a display device with said selected signal selected by said switching device.*

*13. The signal selection circuit according to claim 12, wherein said switching device selects one of said image*

*signal, said information data signal, and an image and information data signal, in accordance with the switching control signal of said data signal processing unit.*

*14. A signal selection circuit of a TV capable of receiving data services, said signal selection circuit comprising:*

*an image signal processing means for processing a desired image signal and outputting an image signal;*

*a data signal processing unit for outputting a data signal by decoding information data received from networks and for outputting a first switching control signal by a selection mode;*

*a PIP signal processing means for processing a predetermined number of input image signals as a main signal and a sub picture signal, and for outputting a PIP signal and a second switching control signal;*

*a first switching device for selecting between said image signal processed in said image signal processing means and/or said data signal processed in said data signal processing unit, in accordance with said first switching control signal;*

*a second switching device for selecting between the PIP signal processed in said PIP signal processing means and a signal selected in said first switching device, in accordance with said second switching control signal generated from said PIP signal processing means; and*

*a driving portion for supplying a display device with a signal selected by said second switching device.*

*15. The signal selection circuit of a TV according to claim 14, wherein said first switching device selects one of said image signal, said data signal, and an image and data signal, in accordance with said first switching control signal.*

*16. The signal selection circuit of a TV according to claim 14, wherein said second switching device selects one of the PIP signal, a PIP+data signal, the data signal, a data+image signal, and the image signal in accordance with the second switching control signal.*

*17. A signal selection circuit of a TV capable of receiving data services, said signal selection circuit comprising:*

*an image signal processing means for processing a desired image signal and outputting an image signal;*

*data signal processing means for outputting data signal by decoding information data received from networks, and a first switching control signal;*

*a PIP signal processing means for processing a predetermined number of image signals as a main signal and a sub picture signal, and for outputting a PIP signal and a second switching control signal;*

*a microcomputer for generating an OSD signal for the operation of the TV, and a third switching control signal by recognizing a selection mode;*

*a first switching device for selecting said image signal processed in said image signal processing means and/or said data signal processed in said data signal processing means, in accordance with the first switching control signal;*

*a second switching device for selecting between the PIP signal processed in said PIP signal processing means and a signal selected in said first switching device, in accordance with said second switching control signal generated in said PIP signal processing means;*

*a third switching device for selecting between said OSD signal output from said microcomputer and a signal selected in said second switching device, in accordance with said third switching control signal generated in said microcomputer; and*

*a driving portion for supplying a display device with a signal selected by said third switching device.*

*18. The signal selection circuit of a TV according to claim 17, wherein said first switching device selects one of said image signal, said data signal, and an image and data signal, in accordance with said first switching control signal.*

*19. The signal selection circuit of a TV according to claim 17, wherein said second switching device selects one of said PIP signal, a PIP and a data signal, said data signal, data and image signal, and said image signal, in accordance with said second switching control signal.*

*20. The signal selection circuit of a TV according to claim 17, wherein said third switching device selects one of an image and OSD signal, a PIP and OSD signal, data and PIP and OSD signal, data and OSD signal, and data and image and OSD signal, in accordance with said third switching control signal.*

*21. The signal selection circuit of a TV according to claim 17, wherein priority is determined in the order of said OSD signal, said PIP signal, said data signal, and said image signal.*

*22. The signal selection circuit of a TV according to claim 17, wherein said image signal is not superimposed when said PIP signal is superimposed on said data signal.*

*23. A signal selection circuit for a TV capable of receiving an image signal and information data services, said signal selection circuit comprising:*

*an image signal processing means for processing a desired image signal and outputting the image signal;*

*a data signal processing unit for outputting data signal by decoding information data received from networks and for outputting a switching control signal by a selection mode;*

*a switching device for selecting said image signal processed in said image signal processing means and/or said data signal processed in said data signal processing unit, in accordance with the switching control signal, thereby to output a selected signal; and*

*a driving portion for supplying a display device with a selected signal selected by said switching device.*

*24. The signal selection circuit according to claim 23, wherein said switching device selects one of said image signal, said data signal, and an image and data signal, in accordance with the switching control signal of said data signal processing unit.*

* * * * *